(12) United States Patent
Park et al.

(10) Patent No.: US 9,856,773 B1
(45) Date of Patent: Jan. 2, 2018

(54) METHOD FOR CONTROLLING EXHAUST GAS PURIFICATION SYSTEM

(71) Applicant: Hyundai Motor Company, Seoul (KR)

(72) Inventors: Jie Won Park, Daejeon (KR); Myung Jong Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/359,942

(22) Filed: Nov. 23, 2016

(30) Foreign Application Priority Data

Aug. 17, 2016 (KR) .................. 10-2016-0104142

(51) Int. Cl.
| | |
|---|---|
| B01D 53/94 | (2006.01) |
| B01D 46/00 | (2006.01) |
| B01D 21/20 | (2006.01) |
| B01J 23/90 | (2006.01) |
| B01J 38/02 | (2006.01) |
| F01N 3/021 | (2006.01) |
| F01N 3/023 | (2006.01) |
| F01N 3/035 | (2006.01) |
| F01N 9/00 | (2006.01) |
| F01N 3/20 | (2006.01) |
| F01N 11/00 | (2006.01) |
| B01D 53/96 | (2006.01) |

(52) U.S. Cl.
CPC ......... *F01N 9/002* (2013.01); *B01D 53/9418* (2013.01); *B01D 53/9495* (2013.01); *B01D 53/96* (2013.01); *B01J 38/02* (2013.01); *F01N 3/023* (2013.01); *F01N 3/035* (2013.01); *F01N 3/2066* (2013.01); *F01N 11/007* (2013.01); *F01N 2900/1606* (2013.01)

(58) Field of Classification Search
CPC ............... B01D 53/9418; B01D 46/00; B01D 2255/915; B01D 2255/9155; B01D 2257/402; B01D 2257/404; B01J 21/20; B01J 23/90; B01J 38/02; F01N 3/023; F01N 3/035; F01N 3/2066

See application file for complete search history.

(56) References Cited

U.S. PATENT DOCUMENTS

| | | | |
|---|---|---|---|
| 2012/0192549 A1 | 8/2012 | Sakurai | |
| 2015/0143799 A1* | 5/2015 | Lee ................... | F01N 9/002 60/274 |

FOREIGN PATENT DOCUMENTS

| | | | | |
|---|---|---|---|---|
| JP | 2785707 B2 | 8/1998 | | |
| JP | 2004-116332 A | 4/2004 | | |
| JP | 2007-107474 A | 4/2007 | | |
| JP | 2007107474 A * | 4/2007 | ............... | F01N 3/02 |
| JP | 2007-247452 A | 9/2007 | | |

(Continued)

*Primary Examiner* — Timothy C Vanoy
(74) *Attorney, Agent, or Firm* — Morgan, Lewis & Bockius LLP

(57) ABSTRACT

A method for controlling an exhaust gas purification system that can effectively implement desulfation of a selective catalytic reduction (SCR) device. The method for controlling an exhaust gas purification system, in which a diesel particulate filter (DPF) and an SCR device are combined, may include calculating a sulfur poisoning amount of the SCR device and an amount of soot loading in the DPF; and increasing a temperature of the SCR device to a desulfation temperature when the sulfur poisoning amount is greater than a first predetermined value and the amount of soot loading is less than a second predetermined value.

7 Claims, 2 Drawing Sheets

(56) References Cited

FOREIGN PATENT DOCUMENTS

| | | | |
|---|---|---|---|
| JP | 2008-303816 | A | 12/2008 |
| JP | 5333598 | B2 | 11/2013 |
| KR | 10-2005-0036860 | A | 4/2005 |

* cited by examiner

METHOD FOR CONTROLLING EXHAUST GAS PURIFICATION SYSTEM

CROSS-REFERENCE TO RELATED APPLICATION

The present application is based on and claims the benefit of priority to Korean Patent Application No. 10-2016-0104142, filed on Aug. 17, 2016, in the Korean Intellectual Property Office, the entire contents of which is incorporated herein for all purposes by this reference.

FIELD OF THE INVENTION

The present invention relates to a method for controlling an exhaust gas purification system that can effectively implement desulfation of a selective catalytic reduction (SCR) device.

BACKGROUND

Various research and development projects have actively been conducted with respect to exhaust gas post-treatment devices for vehicles equipped with diesel engines in order to meet the requirements of emission regulations such as EU6, EU6c, RDE and the like.

In particular, a selective catalytic reduction (SCR) catalyst is essentially required to respond to the RDE regulation. As a post-treatment device using such an SCR catalyst, a combination of a diesel oxidation catalyst (DOC) or a lean $NO_x$ trap (LNT), a diesel particulate filter (DPF), and the SCR catalyst has extensively been used.

The SCR catalyst (especially, Cu-SCR) may be converted into a sulfur oxide such as $SO_3$ at a temperature of approximately 200-300° C. under 500° C., and the sulfur oxide may be adsorbed to the SCR device to result in a sulfur poisoning phenomenon. When a sulfur poisoning amount exceeds a predetermined level, the $NO_x$ purification performance of the catalyst may be degraded.

Meanwhile, when the temperature of the SCR catalyst is increased to 500° C. or higher, desulfation may naturally be performed. However, when a distance between SCR and DPF is increased according to vehicle specifications, the temperature of the SCR catalyst may not be sufficiently increased, and thus, the desulfation of SCR may not appropriately be performed. Therefore, the purification performance of the SCR catalyst may be degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling an exhaust gas purification system that can effectively implement desulfation of a selective catalytic reduction (SCR) device.

According to various aspects of the present invention, a method for controlling an exhaust gas purification system, in which a diesel particulate filter (DPF) and an SCR device are combined, includes: calculating a sulfur poisoning amount of the SCR device and an amount of soot loading in the DPF; and increasing a temperature of the SCR device to a desulfation temperature when the sulfur poisoning amount is greater than a first predetermined value and the amount of soot loading is less than a second predetermined value.

The first predetermined value may be a threshold of the sulfur poisoning amount at which purification performance of the SCR device is degraded.

The second predetermined value may be a threshold of the amount of soot loading at which burning (damage) of the DPF occurs.

The method may further include regenerating the DPF when the sulfur poisoning amount is less than the first predetermined value and the amount of soot loading is greater than a third predetermined value.

The third predetermined value may be a threshold of the amount of soot loading at which the regenerating of the DPF is required.

The sulfur poisoning amount may be determined on the basis of an amount of fuel consumption determined during operating time of an engine and the temperature of the SCR device.

The increasing of the temperature may include increasing the temperature of the SCR device to a temperature suitable for desulfation by post injection of an engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
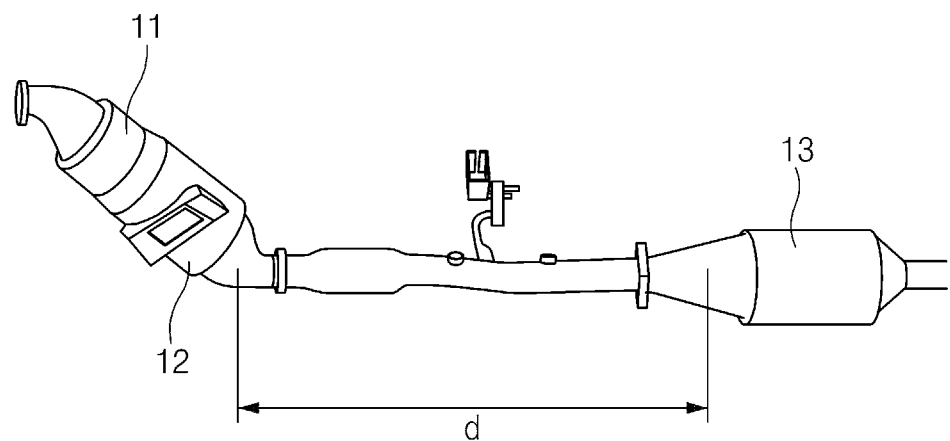
FIG. 1 illustrates an exhaust gas purification system in which a diesel oxidation catalyst (DOC), a diesel particulate filter (DPF), and a selective catalytic reduction (SCR) device are combined, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 illustrates an exhaust gas purification system in which a diesel oxidation catalyst (DOC) 11 or a lean $NO_x$ trap (LNT), a diesel particulate filter (DPF) 12, and a selective catalytic reduction (SCR) device 13 are combined. The DPF 12 and the SCR device 13 may be spaced apart from each other by a predetermined distance d according to vehicle specifications.

Figure 2:
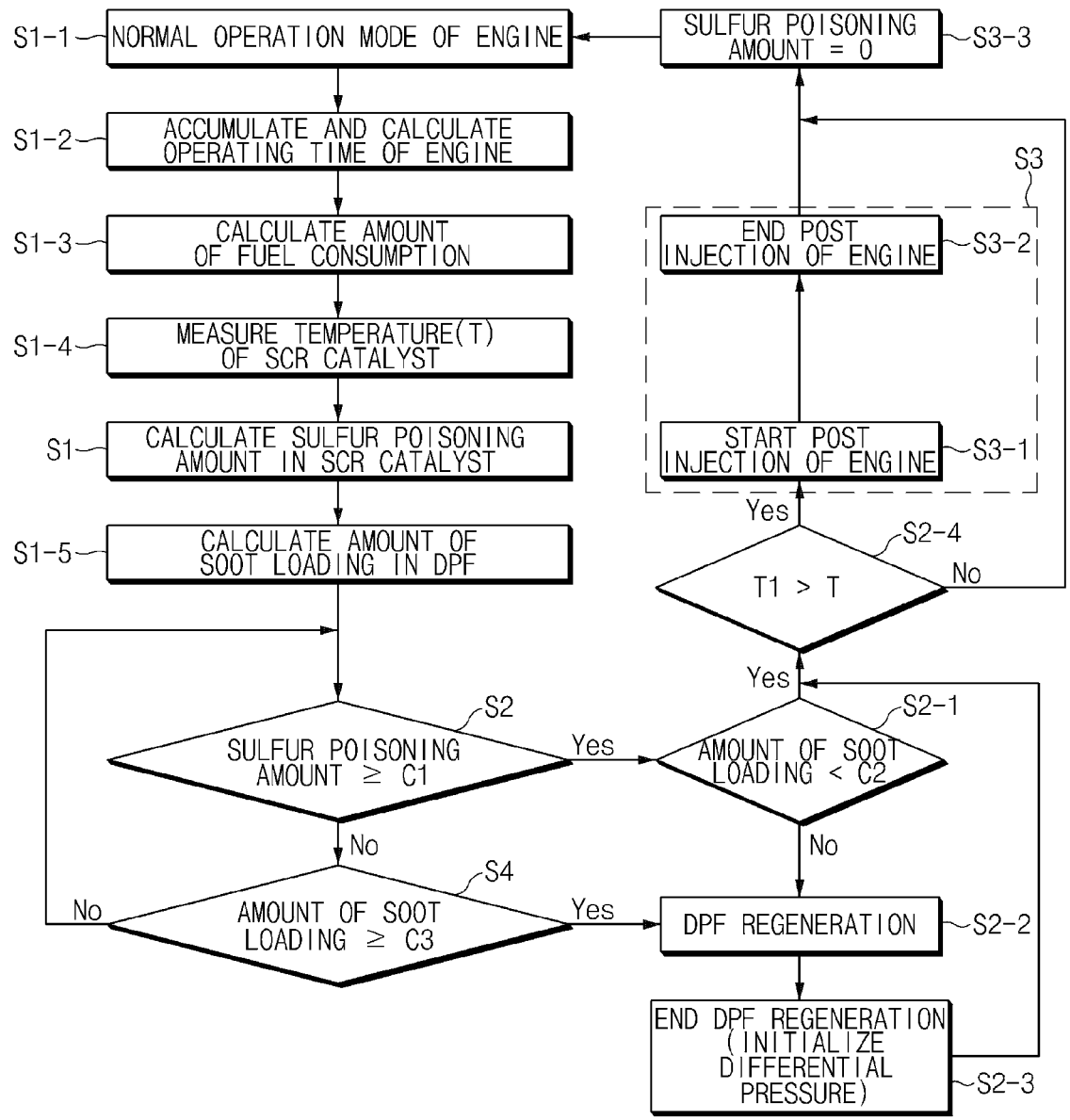
FIG. 2 illustrates a flowchart of a method for controlling desulfation of an SCR device, according to exemplary embodiments of the present invention.

Referring to FIG. 2, a method for controlling desulfation of an SCR device, according to exemplary embodiments of the present invention, includes: calculating a sulfur poisoning amount of the SCR device 13 in operation S1; and increasing a temperature T at an upstream end of the SCR device 13 to a desulfation temperature T1 in operation S3 when the sulfur poisoning amount is greater than a first predetermined value C1.

An engine may be operated in a normal operation mode in operation S1-1, and the operating time of the engine may be accumulated and determined in operation S1-2.

An amount of fuel consumption may be determined during the determined operating time of the engine in operation S1-3, and the temperature T at the upstream end of the SCR device 13 may be measured in operation S1-4.

The sulfur poisoning amount of the SCR device 13 may be determined on the basis of the amount of fuel consumption determined during the operating time of the engine and the temperature T at the upstream end of the SCR device 13 in operation S1.

In addition, an amount of soot loading in the DPF 12 may be determined in operation S1-5. For example, the amount of soot loading in the DPF 12 may be determined using a differential pressure between an upstream end and a downstream end of the DPF 12, an exhaust gas flow rate, and the like.

Thereafter, it may be determined whether or not the sulfur poisoning amount in the SCR device 13 is greater than or equal to the first predetermined value C1 in operation S2. Here, the first predetermined value C1 is a threshold of the sulfur poisoning amount at which the purification performance of the SCR device is degraded.

When the sulfur poisoning amount of the SCR device 13 is greater than or equal to the first predetermined value C1, it may be determined whether or not the amount of soot loading in the DPF 12 is less than a second predetermined value C2 in operation S2-1. Here, the second predetermined value C2 is a threshold of the amount of soot loading at which the burning (damage) of the DPF 12 occurs when the temperature T at the upstream end of the SCR device 13 reaches the desulfation temperature T1, and the desulfation temperature T1 is a temperature suitable for desulfation of the SCR device 13. When the desulfation temperature T1 is reached, the desulfation of the SCR device 13 may be performed.

When the amount of soot loading in the DPF 12 is less than the second predetermined value C2 in operation S2-1, it may be determined whether or not the temperature T at the upstream end of the SCR device 13 is lower than the desulfation temperature T1 of the SCR device 13 in operation S2-4. When the temperature T at the upstream end of the SCR device 13 is lower than the desulfation temperature T1, the temperature increasing operation S3 may be performed.

When the amount of soot loading in the DPF 12 is greater than or equal to the second predetermined value C2 in operation S2-1, a regeneration of the DPF 12 may be performed in operation S2-2. When the regeneration of the DPF 12 ends, the differential pressure of the DPF 12 may be initialized in operation S2-3.

According to exemplary embodiments, the temperature increasing operation S3 includes starting post injection of the engine in operation S3-1, and increasing the temperature T at the upstream end of the SCR device 13 to the desulfation temperature T1 suitable for desulfation to thereby enable the desulfation of the SCR device 13. Here, the post injection of the engine may be maintained for a predetermined time to allow the sulfur poisoning amount of the SCR device 13 to be 0.

Then, after the post injection of the engine ends in operation S3-2, the sulfur poisoning amount may be 0 in operation S3-3.

Meanwhile, when the temperature T at the upstream end of the SCR device 13 is higher than the desulfation temperature T1 of the SCR device 13 in operation S2-4, the desulfation of the SCR device 13 may naturally be performed, and thus, it may be maintained until the sulfur poisoning amount is 0, without the necessity of the temperature increasing operation S3.

In addition, when the sulfur poisoning amount of the SCR device 13 is less than the first predetermined value C1 in operation S2, it may be determined whether or not the amount of soot loading in the DPF 12 is greater than or equal to a third predetermined value C3 in operation S4. Here, the third predetermined value C3 is a threshold of the amount of soot loading at which the regeneration of the DPF 12 is required, and the second predetermined value C2 is set to be less than the third predetermined value C3.

Here, when the amount of soot loading in the DPF 12 is greater than or equal to the third predetermined value C3, the regeneration of the DPF 12 may be performed in operation S2-2. When the regeneration of the DPF 12 ends, the differential pressure of the DFP 12 may be initialized in operation S2-3. When the amount of soot loading in the DPF 12 is less than the third predetermined value C3, the system may return to the aforementioned operation S2.

The temperature increasing operation S3 may be performed when the amount of soot loading in the DPF 12 is less than the second predetermined value C2, and thus, when the temperature of the SCR device 13 is increased for the desulfation of the SCR device 13, the overheat of the DPF 12, excess of the amount of soot loading in the DPF 12, and the like may effectively be prevented, whereby the damage of the DPF 12 may effectively be prevented.

For example, when the third predetermined value C3 (the threshold of the amount of soot loading at which the regeneration of the DPF 12 is required) is set on the basis of 650° C. and the desulfation temperature T1 is 500° C. even if the temperature at the upstream end of the DPF 12 is increased to 650° C., the temperature T at the upstream end of the SCR device 13 may not reach the desulfation temperature T1 of 500° C. due to a distance between the DPF 12 and the SCR device 13. Thus, to allow the temperature T at the upstream end of the SCR device 13 to reach 500° C., it may be necessary to increase the temperature at the upstream end of the DPF 12 to 700° C. or higher. However, since the third predetermined value C3 is set on the basis of 650° C., the amount of soot loading in the DPF 12 may be excessive until the temperature at the upstream end of the DPF 12 reaches 700° C. resulting in the burning (damage) of the DPF 12. Thus, in order to prevent the burning (damage) of the DPF 12, the temperature T at the upstream end of the SCR device 13 may be increased to the desulfation temperature T1 when the amount of soot loading in the DPF 12 is less than the second predetermined value C2 (the threshold of the amount of soot loading at which the burning (damage) of the DPF 12 occurs). The second predetermined value C2 may be set to be less than the third predetermined value C3, and thus, the burning (damage) of the DPF 12 may effectively be prevented in the regeneration of the DPF 12.

As set forth above, according to exemplary embodiments, the desulfation of the SCR device may effectively be performed by calculating the sulfur poisoning amount of the SCR device and controlling the temperature at the upstream end of the SCR device, regardless of a distance between the SCR device and the DPF.

The temperature of the SCR device may be increased only when the amount of soot loading in the DPF is less than the threshold of the amount of soot loading at which the burning (damage) of the DPF occurs, and thus, the burning (damage) of the DPF that may be caused by the temperature increase for the desulfation of the SCR device may be prevented.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an exhaust gas purification system in which a diesel particulate filter (DPF) and a selective catalytic reduction (SCR) device are combined, the method comprising:
   calculating a sulfur poisoning amount of the SCR device and an amount of soot loading in the DPF; and
   increasing a temperature of the SCR device to a desulfation temperature when the sulfur poisoning amount is greater than a first predetermined value and the amount of soot loading is less than a second predetermined value.

2. The method according to claim 1, wherein the first predetermined value is a threshold of the sulfur poisoning amount at which purification performance of the SCR device is degraded.

3. The method according to claim 1, wherein the second predetermined value is a threshold of the amount of soot loading at which damage of the DPF occurs.

4. The method according to claim 1, further comprising regenerating the DPF when the sulfur poisoning amount is less than the first predetermined value and the amount of soot loading is greater than a third predetermined value.

5. The method according to claim 4, wherein the third predetermined value is a threshold of the amount of soot loading at which the regenerating of the DPF is required.

6. The method according to claim 1, wherein the sulfur poisoning amount is determined on a basis of an amount of fuel consumption determined during operating time of an engine and the temperature of the SCR device.

7. The method according to claim 1, wherein the increasing of the temperature includes increasing the temperature of the SCR device to a temperature for desulfation by post injection of an engine.

\* \* \* \* \*